(12) United States Patent
Horii et al.

(10) Patent No.: US 7,921,948 B2
(45) Date of Patent: Apr. 12, 2011

(54) SADDLE SEAT TYPE FUEL-CELL ELECTRIC VEHICLE

(75) Inventors: Yoshiyuki Horii, Saitama (JP); Masamoto Ito, Saitama (JP); Shinji Furuta, Saitama (JP); Jun Morimoto, Saitama (JP); Shinji Kawasaki, Saitama (JP); Atsuko Niwano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 397 days.

(21) Appl. No.: 12/166,742

(22) Filed: Jul. 2, 2008

(65) Prior Publication Data

US 2009/0020347 A1    Jan. 22, 2009

(30) Foreign Application Priority Data

Jul. 20, 2007 (JP) ................................ 2007-189951

(51) Int. Cl.
*B60K 1/00* (2006.01)
(52) U.S. Cl. ................................ 180/65.31; 297/215.16
(58) Field of Classification Search ................ 180/65.3, 180/210, 903, 908
See application file for complete search history.

(56) References Cited

U.S. PATENT DOCUMENTS

| 5,992,554 | A * | 11/1999 | Hasumi et al. | 180/229 |
| 6,722,460 | B2 * | 4/2004 | Yang et al. | 180/220 |
| 7,358,003 | B2 * | 4/2008 | Imaseki et al. | 429/435 |
| 7,484,582 | B2 * | 2/2009 | Iwashita et al. | 180/65.1 |
| 2002/0005305 | A1 * | 1/2002 | Hirayama et al. | 180/68.5 |
| 2004/0035623 | A1 * | 2/2004 | Fecteau et al. | 180/210 |
| 2007/0092764 | A1 * | 4/2007 | Kobayashi | 429/9 |
| 2007/0256882 | A1 * | 11/2007 | Bedard et al. | 180/312 |

FOREIGN PATENT DOCUMENTS

CN    1482032 A    3/2004

* cited by examiner

*Primary Examiner* — J. Allen Shriver, II
*Assistant Examiner* — James Triggs
(74) *Attorney, Agent, or Firm* — Birch, Stewart, Kolasch & Birch, LLP (57) ABSTRACT

A saddle seat type fuel-cell electric vehicle includes a body frame having a pair of right and left main frames connected at their front ends to a head pipe and extending downward therefrom and a pair of right and left under frames connected at their front ends to the head pipe and extending downward therefrom along the right and left main frames on the lower side thereof. A pair of hydrogen cylinders extend substantially vertically along the body frame between the front side of the head pipe and the front side of the front end portion of the footrest so as to interpose the body frame in the lateral direction of the vehicle. A fuel supply unit is provided in a space surrounded by the main frames and the under frames with the hydrogen cylinders being surrounded by a guard pipe connected to the main frames.

20 Claims, 6 Drawing Sheets

SADDLE SEAT TYPE FUEL-CELL ELECTRIC VEHICLE

CROSS-REFERENCE TO RELATED APPLICATIONS

The present application claims priority under 35 USC 119 to Japanese Patent Application No. 2007-189951 filed on Jul. 20, 2007 the entire contents of which are hereby incorporated by reference.

BACKGROUND OF THE INVENTION

1. Field of the Invention

The present invention relates to a saddle seat type fuel-cell electric vehicle, and more particularly to a saddle seat type fuel-cell electric vehicle which can ensure a sufficient space for mounting a footrest and can enlarge the size of a fuel tank.

2. Description of Background Art

A fuel-cell electric vehicle is known that includes a fuel cell for generating electric power by the chemical reaction of hydrogen as a fuel gas and oxygen contained in a reactant gas (air) and a motor adapted to be driven by the electric power supplied from the fuel cell. Usually, such a fuel-cell electric vehicle further includes a fuel tank for storing hydrogen to be supplied to the fuel cell.

CN1482032A discloses a saddle seat type fuel-cell electric vehicle configured as a scooter type two-wheeled vehicle having a plurality of cylindrical fuel tanks.

These fuel tanks extend along a body frame on the lower side thereof, the body frame being connected to a head pipe and extending downward and rearward from the head pipe.

In the layout structure of the fuel tanks disclosed in CN1482032A, an enlargement in the size of each fuel tank for the purpose of increasing mileage may cause various problems such that each fuel tank interferes with a front wheel, that the lateral size of the vehicle is increased, and that a sufficient space for mounting a footrest cannot be ensured.

SUMMARY AND OBJECTS OF THE INVENTION

It is an object of an embodiment of the present invention to provide a saddle seat type fuel-cell electric vehicle which can ensure a sufficient space for mounting a footrest while enlarging the size of each fuel tank.

In accordance with an embodiment of the present invention, a saddle seat type fuel-cell electric vehicle is provided that includes a steering handle, a head pipe for rotatably supporting the steering handle with a body frame connected at one end thereof to the head pipe and extending downward therefrom. A fuel cell for generating electric power by the chemical reaction of a fuel gas and a reactant gas is provided together with a plurality of fuel tanks for storing the fuel gas to be supplied to the fuel cell. A seat for supporting an operator is provided with a low floor type footrest provided between the steering handle and the seat. The fuel cell is located below the seat with the fuel tanks extending substantially vertically along the body frame so as to interpose the body frame in the lateral direction of the vehicle. The upper end portions of the fuel tanks are located so as to overlap the head pipe as viewed in side elevation of the vehicle with the lower end portions of the fuel tanks being located at a level higher than the level of the footrest.

In accordance with an embodiment of the present invention, the width of the footrest is smaller than the distance between the outer ends of the fuel tanks in the lateral direction of the vehicle with the front end portion of the footrest being located behind a vertical portion of the body frame.

In accordance with an embodiment of the present invention, each of the fuel tanks has a fuel supply port for supplying the fuel gas to the fuel cell with the fuel supply port being located at the lower end of at least one of the fuel tanks.

In accordance with an embodiment of the present invention, each of the fuel tanks has a fuel charging port formed adjacent to the fuel supply port for charging the fuel gas with the fuel charging port being located at the upper end of at least one of the fuel tanks.

In accordance with an embodiment of the present invention, the body frame includes a pair of right and left main frames and a pair of right and left under frames respectively provided below the right and left main frames so as to extend therealong. The fuel-cell electric vehicle further includes a fuel supply unit for controlling the amount of the fuel gas to be supplied from the fuel tanks. The fuel supply unit is located in a space surrounded by the main frames and the under frames.

In accordance with an embodiment of the present invention, the fuel-cell electric vehicle further includes a fastening member for fastening the fuel tanks to the body frame and a protective member connected to the body frame so as to surround the fuel tanks.

In accordance with an embodiment of the present invention, the fuel-cell electric vehicle further includes a protective pad mounted on the protective member with the protective pad being formed of a shock absorbing material. The protective pad is partially exposed to an opening formed through an exterior component of the vehicle.

In accordance with an embodiment of the present invention, the fuel-cell electric vehicle is a three-wheeled vehicle having a pair of right and left rear wheels with the distance between the outer ends of the fuel tanks in the lateral direction of the vehicle being shorter than the distance between the outer end surfaces of the right and left rear wheels in the lateral direction of the vehicle.

According to an embodiment of the present invention, the fuel tanks extend substantially vertically along the body frame so as to interpose the body frame in the lateral direction of the vehicle. Further, the upper end portions of the fuel tanks are located so as to overlap the head pipe as viewed in side elevation of the vehicle with the lower end portions of the fuel tanks being located at a level higher than the level of the footrest. Accordingly, the fuel tanks do not interfere with the footrest, so that it is possible to ensure a sufficient space for mounting the footrest and also to enlarge the size of each fuel tank. Further, as compared with the case that the fuel tanks are located on the rear side of the body frame, a flat floor portion of the footrest can be easily formed so as to continue in the lateral direction of the vehicle.

According to an embodiment of the present invention, the width of the footrest is smaller than the distance between the outer ends of the fuel tanks in the lateral direction of the vehicle. Further, the front end portion of the footrest is located behind the vertical portion of the body frame. Accordingly, it is possible to prevent an air flow from directly striking the feet of the operator. Further, the interference between the fuel tanks and the footrest can be further avoided, so that the shape of the flat floor of the footrest can be made simpler.

According to an embodiment of the present invention, each of the fuel tanks has a fuel supply port for supplying the fuel gas to the fuel cell with the fuel supply port being located at the lower end of at least one of the fuel tanks. Accordingly, the distance between the fuel supply port and the fuel cell can be reduced, so that the length of a fuel supply pipe for supplying the fuel gas from the fuel supply port to the fuel cell can be reduced to thereby reduce a pressure loss.

According to an embodiment of the present invention, each of the fuel tanks has a fuel charging port formed adjacent to the fuel supply port for charging the fuel gas with the fuel charging port being located at the upper end of at least one of the fuel tanks. Accordingly, the fuel charging port is located in the vicinity of the head pipe, so that the fuel charging port is easy to access, thereby facilitating a fuel charging operation.

According to an embodiment of the present invention, the body frame includes a pair of right and left main frames and a pair of right and left under frames respectively provided below the right and left main frames so as to extend thereal-ong. The fuel-cell electric vehicle further includes a fuel supply unit for controlling the amount of the fuel gas to be supplied from the fuel tanks. The fuel supply unit is located in a space surrounded by the main frames and the under frames. Accordingly, the space surrounded by the body frame can be effectively used for the location of the fuel supply unit. Further, the fuel supply unit can be protected by the body frame.

According to an embodiment of the present invention, the fuel-cell electric vehicle further includes a fastening member for fastening the fuel tanks to the body frame and a protective member connected to the body frame so as to surround the fuel tanks. Accordingly, the fuel tanks can be stably fastened to the body frame, and the fuel tanks can be protected by the protective member.

According to an embodiment of the present invention, a protective pad formed of a shock absorbing material is mounted on the protective member. The protective pad is partially exposed to an opening formed through an exterior component of the vehicle. Accordingly, the fuel tanks can be further protected by the protective pad. Further, the protective pad may be used as a positioning guide for the exterior component or as a decorative part of the exterior component.

According to an embodiment of the present invention, the fuel-cell electric vehicle is a three-wheeled vehicle having a pair of right and left rear wheels with the distance between the outer ends of the fuel tanks in the lateral direction of the vehicle being shorter than the distance between the outer end surfaces of the right and left rear wheels in the lateral direction of the vehicle. Accordingly, even in the event that the outer end surface of the right or left rear wheel in the lateral direction of the vehicle comes into contact with a road surface, the right or left fuel tank does not come into contact with the road surface, thereby protecting the fuel tanks.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
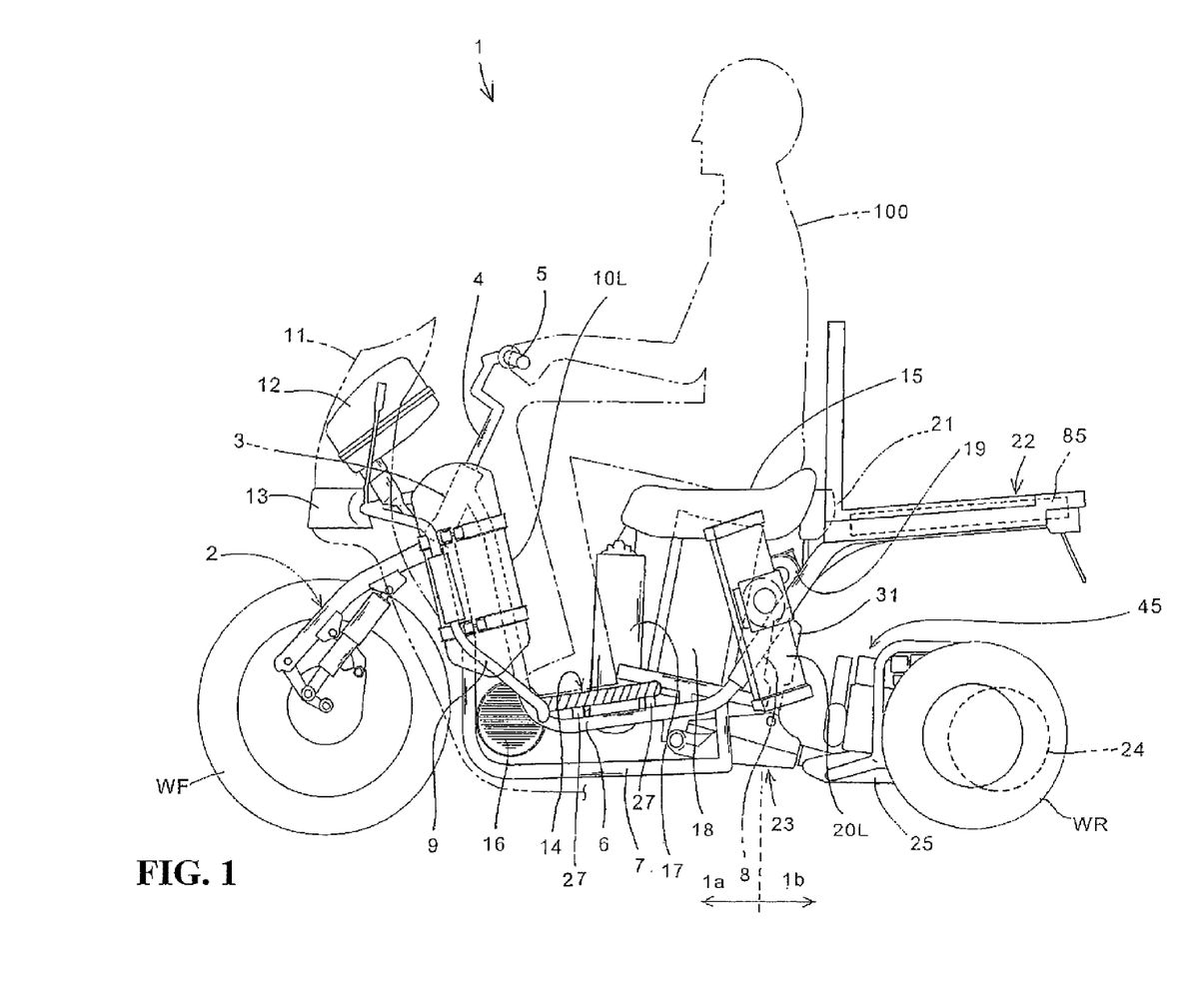
FIG. 1 is a left side view of a saddle seat type fuel-cell electric vehicle according to a preferred embodiment of the present invention.
Figure 2:
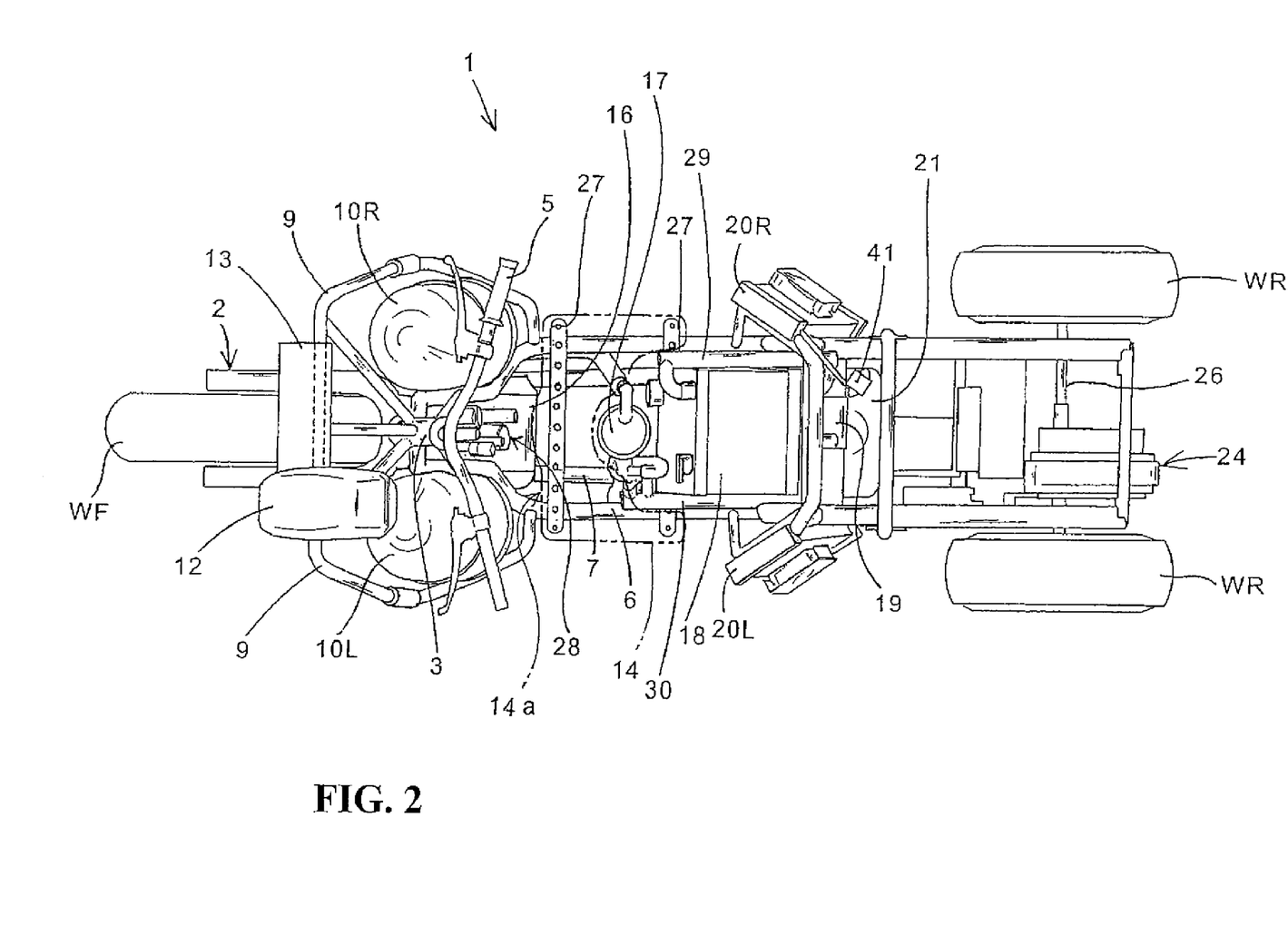
FIG. 2 is a top plan view of the fuel-cell electric vehicle shown in FIG. 1.

A preferred embodiment of the present invention will now be described in detail with reference to the drawings. FIG. 1 is a left side view of a saddle seat type fuel-cell electric vehicle 1 according to a preferred embodiment of the present invention, and FIG. 2 is a top plan view of the fuel-cell electric vehicle 1 shown in FIG. 1. The fuel-cell electric vehicle 1 is a three-wheeled electric vehicle having one front wheel WF as a steered wheel and two rear wheels WR spaced apart from each other in the lateral direction of the vehicle so as to be driven by a motor. The fuel-cell electric vehicle 1 has a scooter type vehicle body configuration such that a low floor type footrest is provided between a steering handle and an operator's seat. Further, the fuel-cell electric vehicle 1 has a fuel-cell electric power generation system including a cell stack formed by stacking a plurality of cells to configure a fuel cell, a fuel (hydrogen) gas supply system for supplying hydrogen gas as fuel to the cell stack, and a reactant gas supply system for supplying a reactant gas (air) containing oxygen to the cell stack. The motor is driven by electric power generated by the fuel cell or by electric power supplied from a secondary battery for storing the electric power generated by the fuel cell, thereby providing power to operate the vehicle 1.

A head pipe 3 is provided at the front end of a body frame, and a steering stem 4 for supporting a bottom link type front suspension 2 is rotatably supported to the head pipe 3. A front wheel WF as a steered wheel is rotatably supported to the lower end portion of the front suspension 2. The front wheel WF can be steered by a steering handle 5 connected to the steering stem 4. A pair of right and left main frames 6 are connected at their front ends to the head pipe 3 and have such a shape that they extend substantially vertically downward from the head pipe 3 and are bent at their lower ends to extend substantially horizontally rearwardly. A pair of right and left under frames 7 having a shape similar to that of the main frames 6 are provided below the main frames 6. More specifically, in a manner similar to the main frames 6, each of the right and left under frames 7 has a vertical portion connected to the head pipe 3 that extend substantially vertically downwardly therefrom and a horizontal portion extending substantially horizontally rearwardly from the lower end of the vertical portion. The rear end portions of the right and left under frames 7 are bent to extend substantially vertically rearwardly and are connected to the right and left main frames 6, respectively. The rear end portions of the right and left main frames 6 behind the connected portions of the under frames 7 to the main frames 7 are connected to a pair of right and left rear frames 8, respectively. A carrier 22 is supported by the right and left rear frames 8. A secondary battery 85 for storing electric power generated by a fuel cell 18 is contained in the carrier 22.

The fuel cell 18 has a substantially rectangular parallelepiped shape. The fuel cell 18 is located below a seat 15 for supporting an operator 100 in such a manner as to be inclined to the rear side of the vehicle at a predetermined angle (e.g., 30 degrees). A pair of right and left radiators 20R and 20L for cooling the fuel cell 18 are provided adjacent to the fuel cell 18 on the right and left sides thereof in the lateral direction of the vehicle. A motor-driven pump 19 as an actuator for feeding cooling water to the radiators 20R and 20L is provided on the rear side of the fuel cell 18. Further, a humidifier 17 for humidifying the reactant gas to be supplied to the fuel cell 18 is provided on the front side of the fuel cell 18. The humidifier 17 has a substantially cylindrical shape, and it is located below the seat 15 at a central position in the lateral direction of the vehicle.

A low floor type footrest 14 is provided between the seat 15 and the steering handle 5. The footrest 14 has a flat floor formed from a resin plate on which the feet of the operator 100 are supported during operation of the vehicle. In this preferred embodiment, the footrest 14 has a laterally symmetrical shape as viewed in plan. A pair of front and rear stays 27 for supporting the resin plate of the footrest 14 are mounted on the upper surfaces of the right and left main frames 6 at such positions that the humidifier 17 is interposed between the stays 27 in the longitudinal direction of the vehicle. Further, a supercharger 16 as an actuator for feeding the reactant gas to the fuel cell 18 is provided on the front lower side of the footrest 14 in a space surrounded by the main frames 6 and the under frames 7.

The vehicle body of the fuel-cell electric vehicle 1 is composed of a front vehicle body 1a and a rear vehicle body 1b connected to the front vehicle body 1a. The front vehicle body 1a includes the body frame and the front wheel WF, wherein the body frame includes the right and left main frames 6 and the right and left under frames 7. The rear vehicle body 1b includes the rear wheels WR. The front vehicle body 1a and the rear vehicle body 1b are connected by a connecting mechanism 23. A shock absorber 31 for absorbing a vertical shock is mounted both to a part of the connecting mechanism 23 and to a mounting frame (not shown) provided between the right and left rear frames 8. A Neidhart swing mechanism using a rubber damper is adopted as the connecting mechanism 23, thereby allowing the vehicle to turn in the condition where the front vehicle body 1a is inclined to the right or left side of the vehicle with the two rear wheels WR maintained in contact with a road surface. A power unit 24 including a driving motor and a speed reduction mechanism in an integral manner is provided between the right and left rear wheels WR on the rear side of a base member 25 of the rear vehicle body 1b. The rear wheels WR are driven by the driving motor in the power unit 24. A driving force output from the power unit 24 is transmitted through an axle 26 to the rear wheels WR. A plurality of drive line electrical parts 45 such as motor control units are mounted on the base member 25 between the rear wheels WR. These drive line electrical parts 45 are substantially boxlike parts having different sizes, and include a motor driver as a motor control unit for controlling the driving motor, a DC-DC converter for converting a DC voltage to a predetermined value, a voltage converter (VCU) for increasing or decreasing a supplied voltage from the fuel cell 18, a main CPU as a motor control unit, a control driver for driving the supercharger 16, a control driver for driving the motor-driven pump 19, and a fuse box for containing a plurality of fuses.

A pair of right and left hydrogen cylinders 10R and 10L as fuel tanks are provided on the right and left sides of the head pipe 3 in the lateral direction of the vehicle so as to interpose the main frames 6 and the under frames 7. In other words, the right hydrogen cylinder 10R is provided on the right side of the right main frame 6 and the right under frame 7, and the left hydrogen cylinder 10L is provided on the left side of the left main frame 6 and the left under frame 7. The footrest 14 is mounted to the main frames 6 so that the width of the footrest 14 is smaller than the distance between the outer ends of the hydrogen cylinders 10R and 10L in the lateral direction of the vehicle. As mentioned above, the hydrogen cylinders 10R and 10L are divisionally located on the right and left sides of the body frame in the lateral direction of the vehicle, so that the hydrogen cylinders 10R and 10L do not interfere with the footrest 14, and it is therefore possible to easily form the flat floor of the footrest 14 continuing in the lateral direction of the vehicle. The hydrogen cylinders 10R and 10L are surrounded on their front side and right and left sides by a guard pipe 9 connected to the main frames 6. In other words, the guard pipe 9 is composed of a front portion for covering the front side of the hydrogen cylinders 10R and 10L and a pair of right and left portions connected to the opposite ends of the front portion for covering the right and left sides of the hydrogen cylinders 10R and 10L. An air cleaner box 12 for filtering the outside air as the reactant gas is provided on the front upper side of the left hydrogen cylinder 10L. The front side of the vehicle is covered with a cowling 11 as an exterior component formed from a thin resin plate or the like. A protective pad 13 is mounted on the front portion of the guard pipe 9. The protective pad 13 is partially exposed to an opening formed through the cowling 11.

The right and left radiators 20R and 20L are inclined downwardly to the front side of the vehicle as viewed in side elevation, and the inside flat surfaces of the right and left radiators 20R and 20L for receiving the air flow are inclined outward in the lateral direction of the vehicle as viewed in plan, so as to easily receive the air flow from the front side of the vehicle. A reserve tank 21 for the cooling water is provided on the rear upper side of the fuel cell 18, and a hydrogen sensor 41 is provided on the upper side of the reserve tank 21.

A hydrogen supply unit 28 including a control unit for controlling the amount of hydrogen gas to be supplied to the fuel cell 18 is provided between the right and left hydrogen cylinders 10R and 10L in a space surrounded by the right and left main frames 6 and the right and left under frames 7. An intake manifold 29 and an exhaust manifold 30 are mounted to the fuel cell 18. The intake manifold 29 functions to supply the reactant gas humidified by the humidifier 17 to the fuel cell 18 at its upper portion. The exhaust manifold 30 functions to exhaust unreacted gases remaining in the fuel cell 18 after the chemical reaction from the lower portion of the fuel cell 18.

Figure 3:
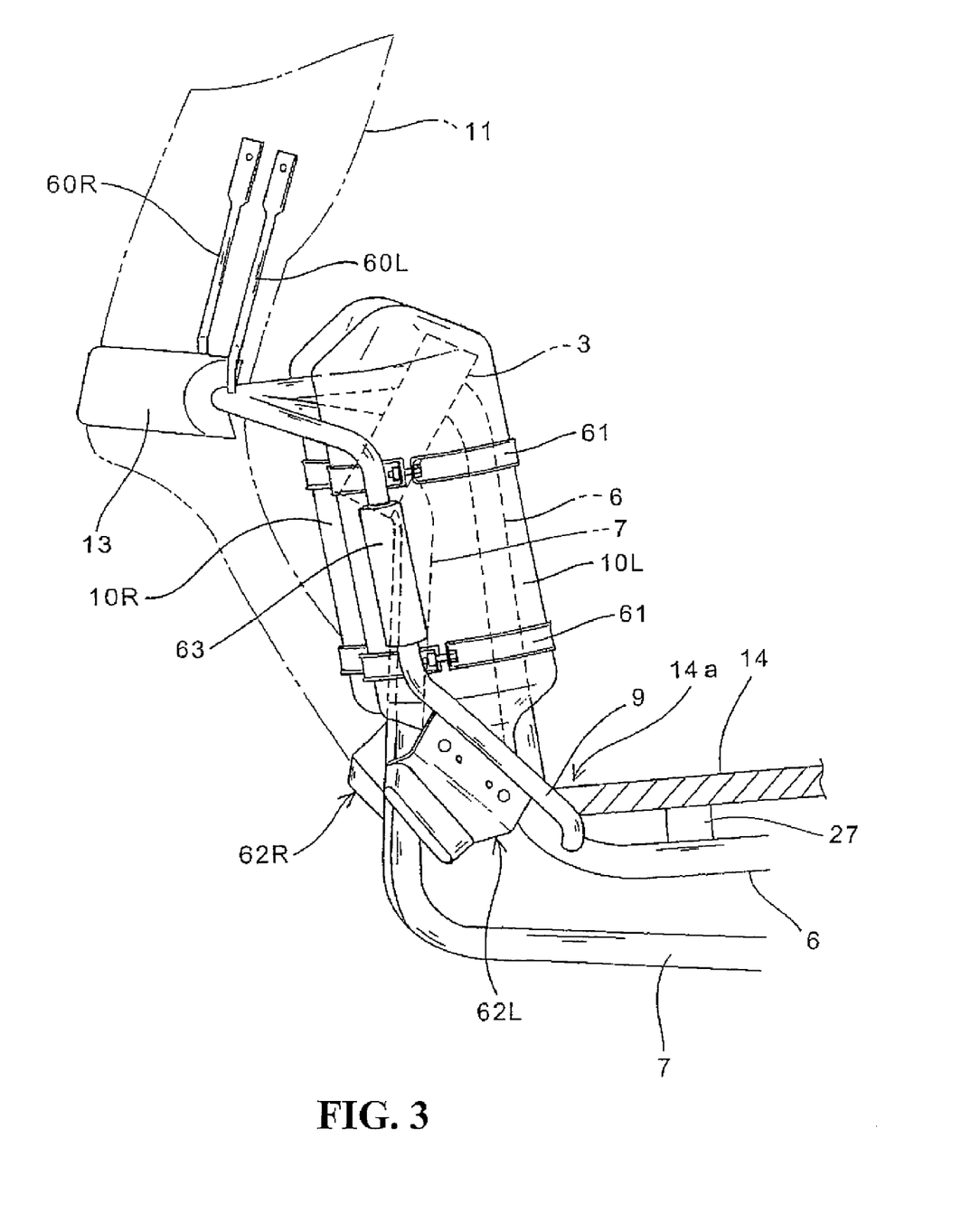
FIG. 3 is a left side view showing the layout structure of hydrogen cylinders mounted on the fuel-cell electric vehicle.

FIG. 3 is a left side view showing the layout structure of the hydrogen cylinders 10R and 10L, in which the same reference numerals as those in FIGS. 1 and 2 denote the same or like parts. The hydrogen cylinders 10R and 10L are mounted to the main frames 6 and the under frames 7 as the body frame of the vehicle by using a plurality of beltlike fastening members 61 formed of metal or the like. The footrest 14 has a flat floor surface continuing in the lateral direction of the vehicle for supporting the feet of the operator The footrest 14 has a front end portion 14a where the toes of the operator come into contact with a cover member or the like for the body frame. As described above, each of the under frames 7 has a vertical portion connected to the head pipe 3 that extend substantially vertically downwardly therefrom and a horizontal portion extending substantially horizontally rearwardly from the lower end of the vertical portion. The front end portion 14a of the footrest 14 is located behind the vertical portions of the under frames 7.

The right and left hydrogen cylinders 10R and 10L each having a substantially cylindrical shape extend substantially vertically along the vertical portions of the right and left main frames 6 and the vertical portions of the right and left under frames 7 so as to interpose the main frames 6 and the under frames 7 as the body frame in the lateral direction of the vehicle. The upper end portions of the hydrogen cylinders 10R and 10L are located so as to overlap the head pipe 3 as viewed in a side elevation of the vehicle, and the lower end portions of the hydrogen cylinders 10R and 10L are located at a level higher than the level of the footrest 14. With this arrangement, the hydrogen cylinders 10R and 10L do not interfere with the footrest 14. Accordingly, even when each of the hydrogen cylinders 10R and 10L has a relatively large size, a sufficient area of the flat floor of the footrest 14 can be ensured and the flexibility of layout of the footrest 14 can be increased. Further, since the front end portion 14a of the footrest 14 is located behind the vertical portions of the right and left under frames 7, the interference between the hydrogen cylinders 10R and 10L and the footrest 14 can be further avoided, so that the shape of the flat floor of the footrest 14 can be a simple construction. Further, since the width of the footrest 14 is smaller than the distance between the outer ends of the hydrogen cylinders 10R and 10L in the lateral direction of the vehicle, it is possible to prevent an air flow from directly striking the feet of the operator. The front end portion 14a of the footrest 14 may be located behind the vertical portions of the right and left main frames 6 which are located behind the vertical portions of the right and left under frames 7.

The protective pad 13 is mounted on the front portion of the guard pipe 9 as a protective member surrounding the hydrogen cylinders 10R and 10L so as to project toward the front side of the vehicle. The protective pad 13 is formed of a shock absorbing material such as a resin capable of absorbing an external force, thus functioning to protect the front portions of the hydrogen cylinders 10R and 10L. Further, the protective pad 13 is partially exposed to the opening of the cowling 11 as mentioned above. Accordingly, the protective pad 13 may be used as a positioning guide for the cowling 11 or as a decorative part of the front exterior component of the vehicle.

A pair of right and left cowl stays 60R and 60L for supporting the cowling 11 are mounted on the front portion (upper portion) of the guard pipe 9 in the vicinity of the protective pad 13. The guard pipe 9 is connected at its front portion through a plurality of pipe members 64, 65R, and 65L to the head pipe 3 on the rear side of the protective pad 13. Further, a pair of cylindrical side protective pads 63 are mounted on the right and left side portions of the guard pipe 9, so as to absorb an external force applied from the right and left sides of the vehicle to the guard pipe 9. Further, a pair of right and left sliders 62R and 62L are mounted on the right and left side portions of the guard pipe 9 at positions below the side protective pads 63. The right and left sliders 62R and 62L function to protect the hydrogen cylinders 10R and 10L so that when the vehicle body is inclined at angles greater than a predetermined angle in the lateral direction of the vehicle, the slider 62R or 62L first comes into contact with a road surface. The road contact portions of the sliders 62R and 62L may be exposed to openings optionally formed through the cowling 11, thereby using the sliders 62R and 62L as decorative parts from the viewpoint of the external appearance.

Figure 4:
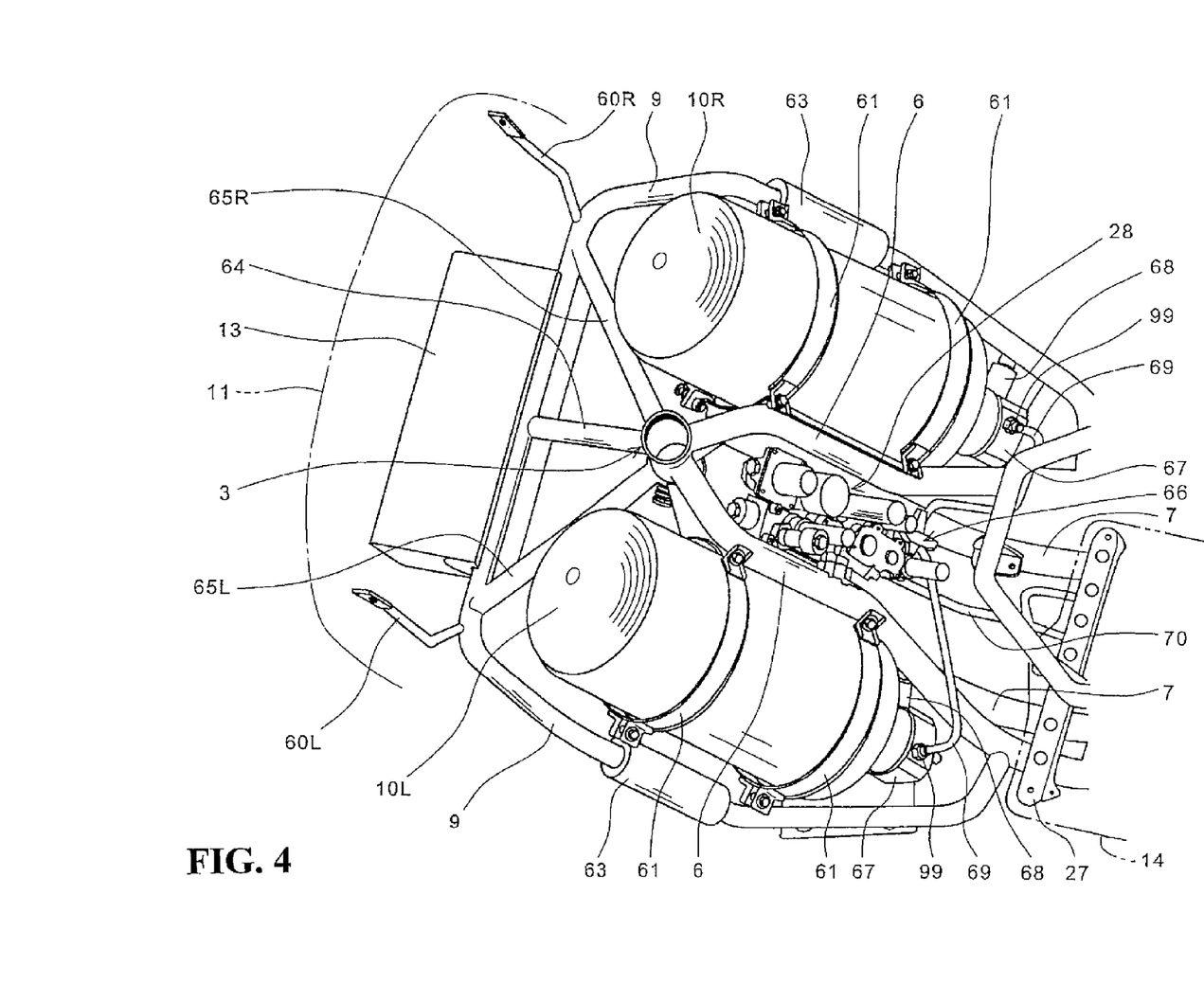
FIG. 4 is a perspective view showing the layout structure of the hydrogen cylinders as viewed from the upper side of the vehicle.

FIG. 4 is a perspective view showing the layout structure of the hydrogen cylinders 10R and 10L as viewed from the upper side of the vehicle, in which the same reference numerals as those in FIGS. 1 to 3 denote the same or like parts. Each of the hydrogen cylinders 10R and 10L has a substantially cylindrical body portion. A blocklike plug member 67 having a fuel supply port 99 is mounted to one end of the body portion. A fuel supply pipe 69 is connected to the fuel supply port 99 in each hydrogen cylinder with the fuel supply pipes 69 extending from the hydrogen cylinders 10R and 10L being connected to a manifold portion 66. The hydrogen gas to be supplied to the fuel cell 18 is first introduced through the fuel supply pipe 69 and the manifold portion 66 to the hydrogen supply unit 28. A fuel supply pipe 70 is connected at one end thereof to the hydrogen supply unit 28. The hydrogen supply unit 28 functions to supply an optimum amount of hydrogen gas through the fuel supply pipe 70 to the fuel cell 18 according to a demand of electric power in the fuel cell 18. The fuel supply pipe 70 connected to the hydrogen supply unit 28 extends below the footrest 14 to the fuel cell 18 located below the seat 15.

In this preferred embodiment, the fuel supply ports 99 of the hydrogen cylinders 10R and 10L are located at the lower ends of both the hydrogen cylinders 10R and 10L. Accordingly, the distance from each fuel supply port 99 to the fuel cell 18 can be reduced, so that the length of each fuel supply pipe 69 can be reduced to thereby reduce a pressure loss. Further, even in the case where one of the fuel supply ports 99 is located at the lower end of any one of the hydrogen cylinders 10R and 10L and the other fuel supply port 99 is located at the upper end of the other hydrogen cylinder, the total length of the fuel supply pipes 69 can be made smaller than the case where the fuel supply ports 99 are located at the upper ends of both the hydrogen cylinders 10R and 10L. A hydrogen charging port 68 for charging hydrogen to each of the hydrogen cylinders 10R and 10L is mounted on the plug member 67 adjacent to the fuel supply port 99 in each hydrogen cylinder.

The hydrogen supply unit 28 is located in the laterally central space surrounded by the right and left main frames 6 and the right and left under frames 7. With this arrangement, the space surrounded by the body frame behind the head pipe 3 can be effectively used, and the hydrogen supply unit 28 can be protected by the body frame. Further, the plurality of pipe members, that is, the central reinforcing pipe 64 and the right and left reinforcing pipes 65R and 65L are connected to the head pipe 3 and the front portion of the guard pipe 9 in such a manner so as to form a truss structure. With this structure, the strength of the structure including the guard pipe 9 can be increased to thereby further prevent the transmission of an external force from the protective pad 13 to the hydrogen cylinders 10R and 10L. Further, the torsional rigidity of the head pipe 3 to the body frame can be increased to thereby improve the handling of the vehicle.

Figure 5:
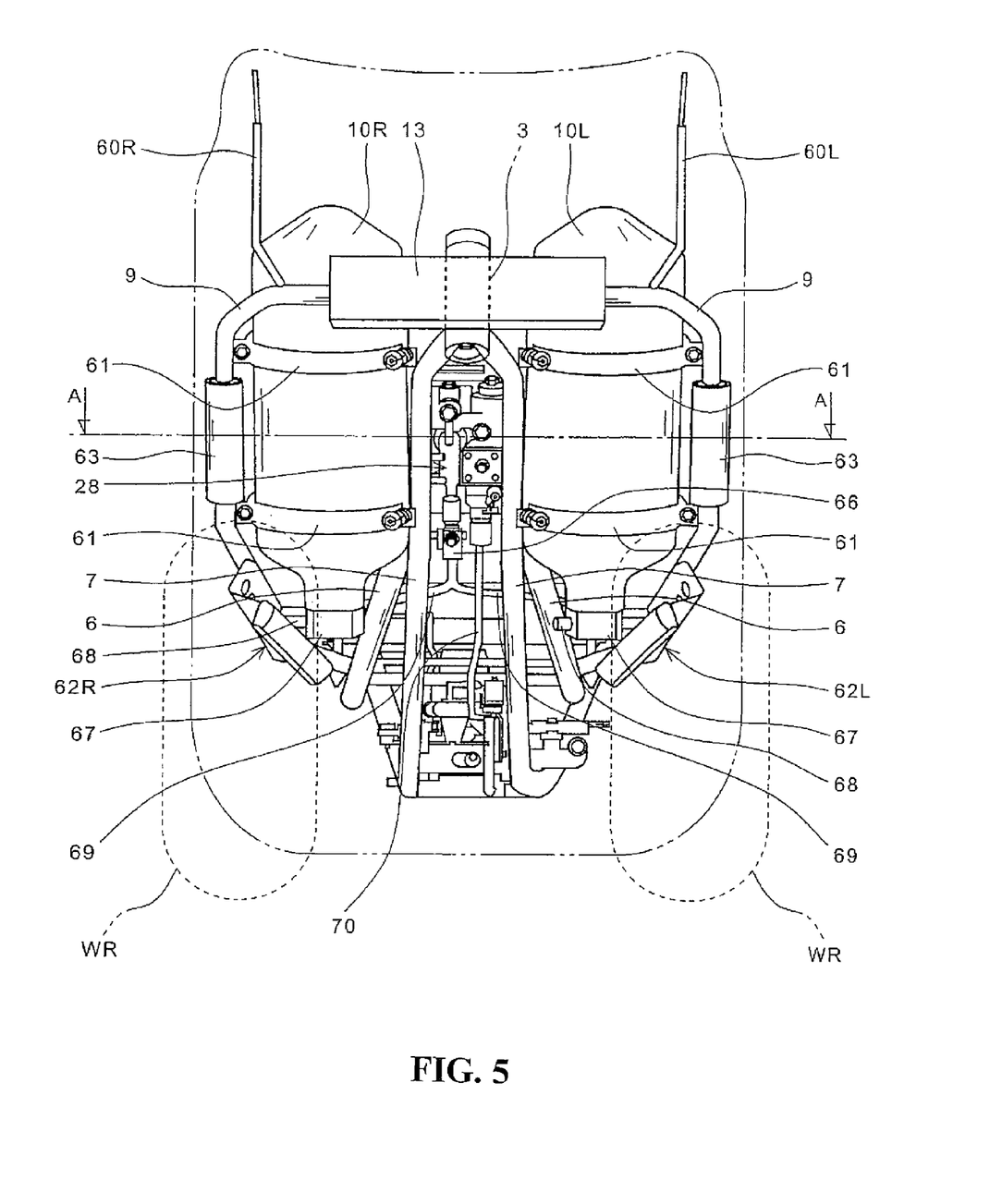
FIG. 5 is a front elevation showing the layout structure of the hydrogen cylinders.
Figure 6:
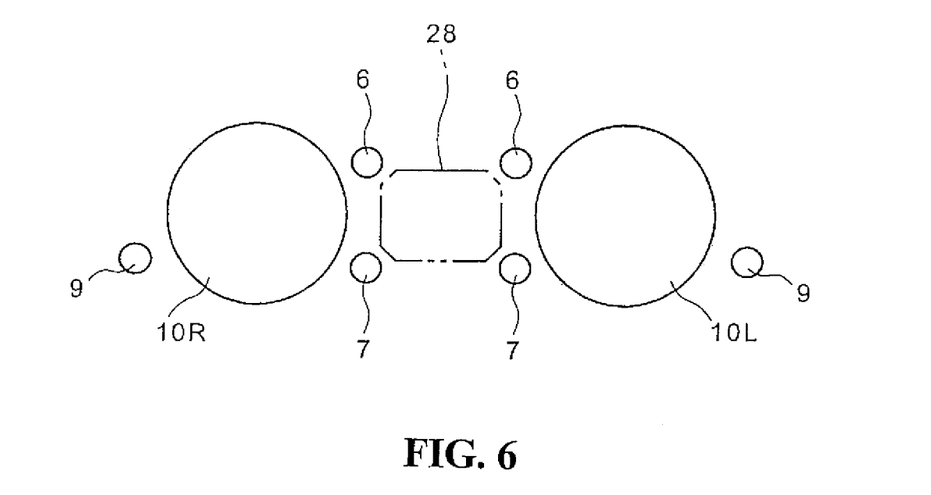
FIG. 6 is a schematic cross section taken along the line A-A in FIG. 5.

FIG. 5 is a front elevational view showing the layout structure of the hydrogen cylinders 10R and 10L. FIG. 6 is a schematic cross section taken along the line A-A in FIG. 5, in which the same reference numerals as those in FIGS. 1 to 4 denote the same or like parts. The hydrogen supply unit 28 is located in the space surrounded by the main frames 6 and the under frames 7, and the hydrogen cylinders 10R and 10L are arranged so as to interpose the hydrogen supply unit 28 in the lateral direction of the vehicle. Accordingly, the cylindrical body portions of the hydrogen cylinders 10R and 10L can be slightly placed in the space between the main frames 6 and the under frames 7. As a result, the hydrogen supply unit 28 and each of the hydrogen cylinders 10R and 10L can be arranged close to each other so as to interpose the body frame, so that the hydrogen cylinders 10R and 10L can be enlarged in size.

Further, even in the event that the hydrogen cylinders 10R and 10L are moved inward in the lateral direction of the vehicle by an external force, the hydrogen cylinders 10R and 10L first come into contact with the body frame to stop in this contact condition, thereby preventing the contact of the hydrogen cylinders 10R and 10L with the hydrogen supply unit 28. In this case, the hydrogen cylinders 10R and 10L also function to protect the hydrogen supply unit 28 from an external force. Further, the distance between the outer ends of the hydrogen cylinders 10R and 10L in the lateral direction of the vehicle is shorter than the distance between the outer end surfaces of the right and left rear wheels WR in the lateral direction of the vehicle. Accordingly, even in the event that the outer end surface of the right or left rear wheel WR in the lateral direction of the vehicle comes into contact with a road surface, the right or left hydrogen cylinder 10R or 10L does not come into contact with the road surface, thereby protecting the hydrogen cylinders 10R and 10L. Further, the fuel supply pipes for supplying the hydrogen gas are located inside of the body frame and the guard pipe 9, thereby protecting the fuel supply pipes. Further, the sliders 62R and 62L are located so as to cover the plug members 67 of the hydrogen cylinders 10R and 10L, thereby further protecting the fuel supply ports 99, the fuel charging ports 68, and the fuel supply pipes 69 of the hydrogen cylinders 10R and 10L.

Figure 7:
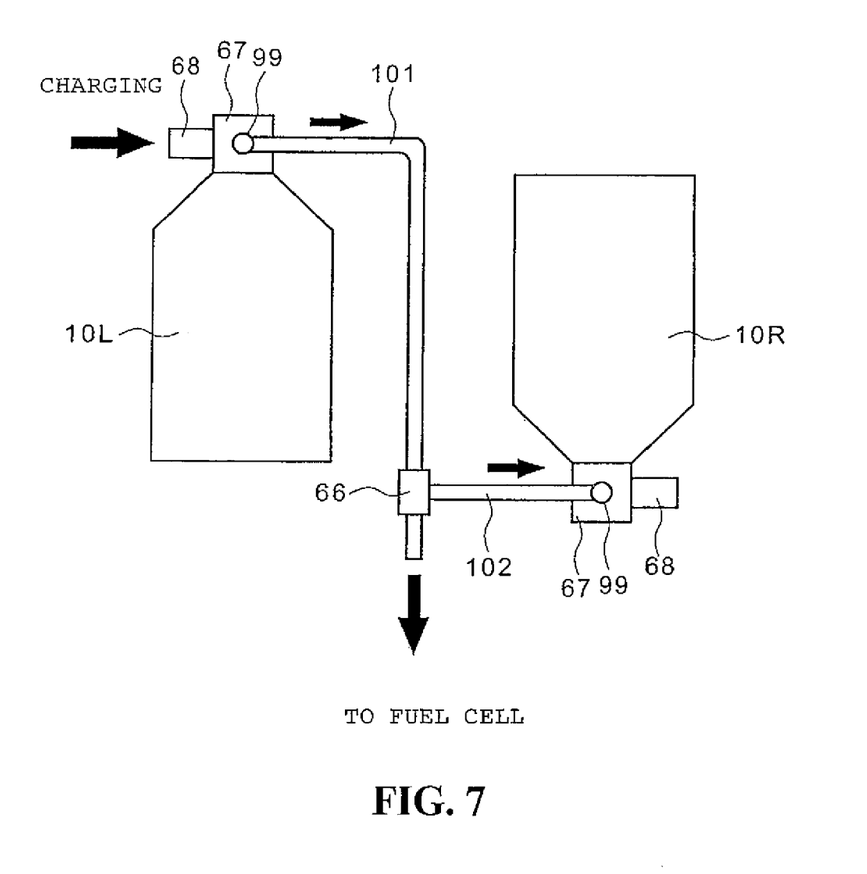
FIG. 7 is a schematic view showing a modification of the layout structure of the hydrogen cylinders.

FIG. 7 is a schematic view showing a modification of the layout structure of the hydrogen cylinders 10R and 10L, in which the same reference numerals as those in FIGS. 1 to 6 denote the same or like parts. In this modification, the left hydrogen cylinder 10L is inverted in its vertical direction and the fuel charging port 68 is provided at the upper end of the left hydrogen cylinder 10L. The fuel charging port 68 is provided for each hydrogen cylinder and the two hydrogen cylinders 10R and 10L are connected by fuel supply pipes 10R and 10L. Accordingly, hydrogen gas can be charged from the fuel charging port 68 of any one of the two hydrogen cylinders 10R and 10L into the two hydrogen cylinders 10R and 10L. More specifically, by changing the direction of flow in the fuel supply pipes 101 and 102 at the manifold portion 66, hydrogen gas can be charged from the fuel charging port 68 of the left hydrogen cylinder 10L through the fuel supply pipes 101 and 102 not only into the left hydrogen cylinder 10L, but also into the right hydrogen cylinder 10R. With this arrangement, the fuel charging port 68 of the left hydrogen cylinder 10L is located in the vicinity of the head pipe 3, so that the fuel charging port 68 of the left hydrogen cylinder 10L is easy to access, thereby facilitating a fuel charging operation.

The present invention is not limited to the above preferred embodiment, but various modifications may be made in the shape and position of the hydrogen cylinders, in the shape of the body frame and the guard pipe, in the shape and position of the protective pad, in the configuration of the hydrogen supply unit, etc. For example, the body frame connected to the head pipe and extending rearwardly therefrom may be composed of only the right and left main frames. Further, the saddle seat type fuel-cell electric vehicle is not limited to a three-wheeled vehicle as in the above preferred embodiment, but may be applied to a two-wheeled vehicle or a four-wheeled vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle seat type fuel-cell electric vehicle comprising:
   a steering handle;
   a head pipe for rotatably supporting said steering handle;
   a body frame connected at one end thereof to said head pipe and extending downward therefrom;
   a fuel cell for generating electric power by the chemical reaction of a fuel gas and a reactant gas;
   a plurality of fuel tanks for storing said fuel gas to be supplied to said fuel cell;
   a seat for supporting an operator; and
   a low floor type footrest provided between said steering handle and said seat, said fuel cell being located below said seat;
   wherein said fuel tanks extend substantially vertically along said body frame so as to interpose said body frame in the lateral direction of said vehicle; and
   the upper end portions of said fuel tanks are located so as to overlap said head pipe as viewed in side elevation of said vehicle with the lower end portions of said fuel tanks being located at a level higher than the level of said footrest, and
   further comprising:
   a guard pipe with a linear portion which is located forward of the head pipe which extends in a width direction of the vehicle, and
   a central reinforcing pipe and a pair of right and left reinforcing pipes each of which is connected to the head pipe and to a front portion of the guard pipe in such a manner so as to form a truss structure.

2. The saddle seat type fuel-cell electric vehicle according to claim 1, wherein:
   the width of said footrest is smaller than the distance between the outer ends of said fuel tanks in the lateral direction of said vehicle; and
   a front end portion of said footrest is located behind a vertical portion of said body frame.

3. The saddle seat type fuel-cell electric vehicle according to claim 1, wherein:
   each of said fuel tanks has a fuel supply port for supplying said fuel gas to said fuel cell; and
   said fuel supply port is located at the lower end of at least one of said fuel tanks.

4. The saddle seat type fuel-cell electric vehicle according to claim 2, wherein:
   each of said fuel tanks has a fuel supply port for supplying said fuel gas to said fuel cell; and
   said fuel supply port is located at the lower end of at least one of said fuel tanks.

5. The saddle seat type fuel-cell electric vehicle according to claim 3, wherein:
   each of said fuel tanks has a fuel charging port formed adjacent to said fuel supply port for charging said fuel gas; and
   said fuel charging port is located at the upper end of at least one of said fuel tanks.

6. The saddle seat type fuel-cell electric vehicle according to claim 4, wherein:
   each of said fuel tanks has a fuel charging port formed adjacent to said fuel supply port for charging said fuel gas; and
   said fuel charging port is located at the upper end of at least one of said fuel tanks.

7. The saddle seat type fuel-cell electric vehicle according to claim 1, wherein:
   said body frame comprises a pair of right and left main frames and a pair of right and left under frames respectively provided below said right and left main frames so as to extend therealong;
   said fuel-cell electric vehicle further comprises a fuel supply unit for controlling the amount of said fuel gas to be supplied from said fuel tanks; and
   said fuel supply unit is located in a space surrounded by said main frames and said under frames.

8. The saddle seat type fuel-cell electric vehicle according to claim 2, wherein:
said body frame comprises a pair of right and left main frames and a pair of right and left under frames respectively provided below said right and left main frames so as to extend therealong;
said fuel-cell electric vehicle further comprises a fuel supply unit for controlling the amount of said fuel gas to be supplied from said fuel tanks; and
said fuel supply unit is located in a space surrounded by said main frames and said under frames.

9. The saddle seat type fuel-cell electric vehicle according to claim 3, wherein:
said body frame comprises a pair of right and left main frames and a pair of right and left under frames respectively provided below said right and left main frames so as to extend therealong;
said fuel-cell electric vehicle further comprises a fuel supply unit for controlling the amount of said fuel gas to be supplied from said fuel tanks; and
said fuel supply unit is located in a space surrounded by said main frames and said under frames.

10. The saddle seat type fuel-cell electric vehicle according to claim 4, wherein:
said body frame comprises a pair of right and left main frames and a pair of right and left under frames respectively provided below said right and left main frames so as to extend therealong;
said fuel-cell electric vehicle further comprises a fuel supply unit for controlling the amount of said fuel gas to be supplied from said fuel tanks; and
said fuel supply unit is located in a space surrounded by said main frames and said under frames.

11. The saddle seat type fuel-cell electric vehicle according to claim 1, and further comprising:
a fastening member for fastening said fuel tanks to said body frame; and
a protective member connected to said body frame so as to surround said fuel tanks.

12. The saddle seat type fuel-cell electric vehicle according to claim 2, and further comprising:
a fastening member for fastening said fuel tanks to said body frame; and
a protective member connected to said body frame so as to surround said fuel tanks.

13. The saddle seat type fuel-cell electric vehicle according to claim 3, and further comprising:
a fastening member for fastening said fuel tanks to said body frame; and
a protective member connected to said body frame so as to surround said fuel tanks.

14. The saddle seat type fuel-cell electric vehicle according to claim 1, wherein:
said fuel-cell electric vehicle is a three-wheeled vehicle having a pair of right and left rear wheels; and
the distance between the outer ends of said fuel tanks in the lateral direction of said vehicle is shorter than the distance between the outer end surfaces of said right and left rear wheels in the lateral direction of said vehicle.

15. The saddle seat type fuel-cell electric vehicle according to claim 2, wherein:
said fuel-cell electric vehicle is a three-wheeled vehicle having a pair of right and left rear wheels; and
the distance between the outer ends of said fuel tanks in the lateral direction of said vehicle is shorter than the distance between the outer end surfaces of said right and left rear wheels in the lateral direction of said vehicle.

16. The saddle seat type fuel-cell electric vehicle according to claim 3, wherein:
said fuel-cell electric vehicle is a three-wheeled vehicle having a pair of right and left rear wheels; and
the distance between the outer ends of said fuel tanks in the lateral direction of said vehicle is shorter than the distance between the outer end surfaces of said right and left rear wheels in the lateral direction of said vehicle.

17. The saddle seat type fuel-cell electric vehicle according to claim 4, wherein:
said fuel-cell electric vehicle is a three-wheeled vehicle having a pair of right and left rear wheels; and
the distance between the outer ends of said fuel tanks in the lateral direction of said vehicle is shorter than the distance between the outer end surfaces of said right and left rear wheels in the lateral direction of said vehicle.

18. The saddle seat type fuel-cell electric vehicle according to claim 7, wherein:
said fuel-cell electric vehicle is a three-wheeled vehicle having a pair of right and left rear wheels; and
the distance between the outer ends of said fuel tanks in the lateral direction of said vehicle is shorter than the distance between the outer end surfaces of said right and left rear wheels in the lateral direction of said vehicle.

19. The saddle seat type fuel-cell electric vehicle according to claim 11, wherein:
said fuel-cell electric vehicle is a three-wheeled vehicle having a pair of right and left rear wheels; and
the distance between the outer ends of said fuel tanks in the lateral direction of said vehicle is shorter than the distance between the outer end surfaces of said right and left rear wheels in the lateral direction of said vehicle.

20. A saddle seat type fuel-cell electric vehicle, comprising:
a steering handle;
a head pipe for rotatably supporting said steering handle;
a body frame connected at one end thereof to said head pipe and extending downward therefrom;
a fuel cell for generating electric power by the chemical reaction of a fuel gas and a reactant gas;
a plurality of fuel tanks for storing said fuel gas to be supplied to said fuel cell;
a seat for supporting an operator; and
a low floor type footrest provided between said steering handle and said seat, said fuel cell being located below said seat;
wherein said fuel tanks extend substantially vertically along said body frame so as to interpose said body frame in the lateral direction of said vehicle; and
the upper end portions of said fuel tanks are located so as to overlap said head pipe as viewed in side elevation of said vehicle with the lower end portions of said fuel tanks being located at a level higher than the level of said footrest,
and further comprising:
a protective pad mounted on said protective member, said protective pad being formed of a shock absorbing material;
wherein said protective pad is partially exposed to an opening formed through an exterior component of said vehicle.

* * * * *